(12) United States Patent
Nonaka et al.

(10) Patent No.: US 6,516,003 B1
(45) Date of Patent: Feb. 4, 2003

(54) DATA COMMUNICATION APPARATUS

(75) Inventors: Masato Nonaka, Tokyo (JP); Kiyoshi Fukui, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/276,116

(22) Filed: Mar. 25, 1999

(30) Foreign Application Priority Data

Oct. 23, 1998 (JP) ............................................ 10-301827

(51) Int. Cl.⁷ ............................... H04J 3/24; H04J 3/07
(52) U.S. Cl. ........................ 370/474; 370/506; 714/701
(58) Field of Search ................................ 370/230, 235, 370/242, 216, 252, 470, 474, 473, 506, 508, 528; 714/701; 375/141, 253, 354, 356, 363, 368, 340

(56) References Cited

U.S. PATENT DOCUMENTS

| | | | |
|---|---|---|---|
| 4,607,364 A | * | 8/1986 | Neumann et al. ............. 370/99 |
| 5,761,212 A | * | 6/1998 | Foland et al. ............... 371/21.2 |
| 5,822,328 A | * | 10/1998 | Derby et al. ................. 370/507 |
| 5,943,376 A | * | 8/1999 | Proctor et al. .............. 370/358 |
| 6,266,349 B1 | * | 7/2001 | Fukui et al. ................. 370/515 |

OTHER PUBLICATIONS

Tom Geary. "Multiplexing Protocol for Low Bitrate Multimedia Communication over Low Error–Prone Channels". International Telecommunication Union Telecommunication Standardization Sector. Sep. 1997, Recommendation H.223–Annex.

* cited by examiner

*Primary Examiner*—Alpus H. Hsu
*Assistant Examiner*—Duc Ho
(74) *Attorney, Agent, or Firm*—Rabin & Berdo, P.C.

(57) ABSTRACT

In the conventional data communication apparatus, there has been arisen a flag emulation due to a false pattern similar to the pattern of the true flag in a frame signal including a plurality of frames. To avoid the flag emulation, the data communication apparatus according to the present invention comprises detecting circuit and a preparing circuit. The detecting circuit detects a false pattern in the bit stream while the preparing circuit prepares a frame using the portion of the bit stream other than the detected false pattern, thus enabling avoidance of the flag emulation due to the false flag.

9 Claims, 8 Drawing Sheets

DATA COMMUNICATION APPARATUS

BACKGROUND OF THE INVENTION

1. Field of the Invention

The present invention relates to a data communication system transmitting and receiving a data stream including a plurality of frames and a plurality of flags thereamong.

2. Description of Related Art

To detect the boundaries of the frames, flags such as HDLC (High-Level Data Link Control) flags and PN (Pseudo Noise) flags, have been used. As taught in the U.S. Pat. No. 6,266,349 "METHOD AND APPARATUS FOR DETECTING FRAME IN DATA STREAM", Fukui et al on Jul. 24, 2001 and assigned to Oki Electric Industry Co., Ltd, a communication system using such flags might cause a flag emulation. A flag emulation is defined as follows: a bit stream similar to the pattern of the flags in a frame which forces the receipt apparatus to misunderstand the bit stream as a flag; and consequently the frame fails to be completely regenerated by the receipt apparatus. Hereinafter, such a bit stream may be referred to as a "false flag" or "false pattern".

Figure 8:
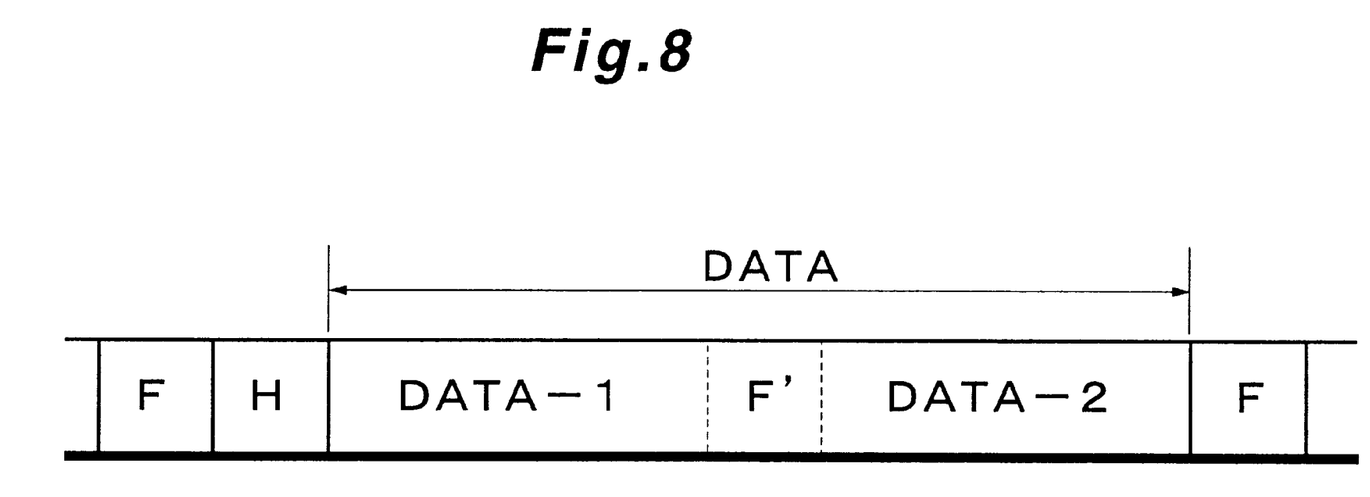
FIG. 8 is an explanatory diagram of the flag emulation.

In general, as shown in FIG. 8, each frame is constructed of a header and a data, wherein the header is indicated by "H", and flags are indicated by "F". There are cases when error check data such as CRC(Cyclic Redundancy Check) data may be added. If the data has a false flag (F'), the false flag (F') leads to a flag emulation. Namely, the receipt apparatus misunderstand the false flag as the boundary of the frame which is now receiving. So, the receipt apparatus processes the remaining data as data –2 without a header or some other non-effective data. Therefore, the receipt apparatus has failed to acquire the contents of the remaining data as well as the contents of the false flag (F').

As countermeasures against this problem, the above patent application has disclosed several techniques. Among them, there is an insertion of a "mark" after each false flag to represent the presence of the false flag, which enables avoidance of a flag emulation. This technique, however, makes rather complicated the configuration of both the transmission apparatus and the receipt apparatus, in comparison with the prior art; besides, it does not meet ITU-T Recommendation H. 233/Annex A—Multiplexing Protocol for Low Bitrate Multimedia Communication over Low Error-Prone Channels (1998).

SUMMARY OF THE INVENTION

The object of the present invention is to provide a data communication apparatus that is robust to flag emulation.

According to one aspect of the present invention, there is provided a data communication apparatus which prepares a frame signal including a plurality of frames and a plurality of flags enabling recognition of the plurality of frames, wherein each frame includes a bit stream and an additional data and each flag is laid between two frames adjacent to each other, the data communication apparatus comprising: a detecting circuit which detects a false pattern similar to the pattern of the flags in each bit stream; and a preparing circuit which prepares at least one frame using the portion of the bit stream other than the detected false pattern.

According to another aspect of the present invention, there is provided data communication apparatus, wherein the preparing circuit includes a additional data preparing circuit which prepares an additional data for the portion, and a frame preparing circuit which prepares a frame using the additional data and the portion.

According to further another aspect of the present invention, there is provided a data communication apparatus, wherein the detecting circuit detects a false pattern in the prepared frame, and the preparing circuit prepares another frame using the portion of the prepared frame other than the detected false pattern therein.

According to still another aspect of the present invention, there is provided a data communication apparatus which prepares a frame signal including a plurality of frames and a plurality of flags enabling recognition of the plurality of frames, wherein each frame includes a bit stream and an additional data and each flag is laid between two frames adjacent to each other, the data communication apparatus comprising: a detecting circuit which detects a false pattern similar to the pattern of the flags in each bit stream; a dividing circuit which divides the bit stream into a first and a second portions so that the first portion includes a part of the detected false pattern and the second portion includes the other part thereof; and a preparing circuit which prepares a frame using the first portion and prepares another frame using the second portion.

According to still another aspect of the present invention, there is provided a data communication apparatus which receives a frame signal including a plurality of frames, a plurality of first flags, and a second flag, wherein each frame includes a bit stream and an additional data, each first flag is laid between two frames adjacent to each other, and the second flag is laid at the predetermined distance from the false pattern similar to the pattern of the flags in a bit stream, the pattern of the firsts flags and the pattern of the second flag being identical with each other, the data communication apparatus comprising: a detecting circuit which detects a plurality of patterns similar to the pattern of the flags in the frame signal; a recognizing circuit which recognizes a first pattern and a second pattern at the predetermined distance from the first pattern among the plurality of detected patterns, as the false pattern and the second flag; and a deleting circuit which deletes the plurality of the first flags and the second flags from the frame signal to prepare the plurality of frames.

DESCRIPTION OF THE PREFERRED EMBODIMENTS

The preferred embodiments of the data communication apparatus according to the present invention will be now described in detail with reference to the accompanying drawings hereinbelow.

<First Embodiment>

Figure 1:
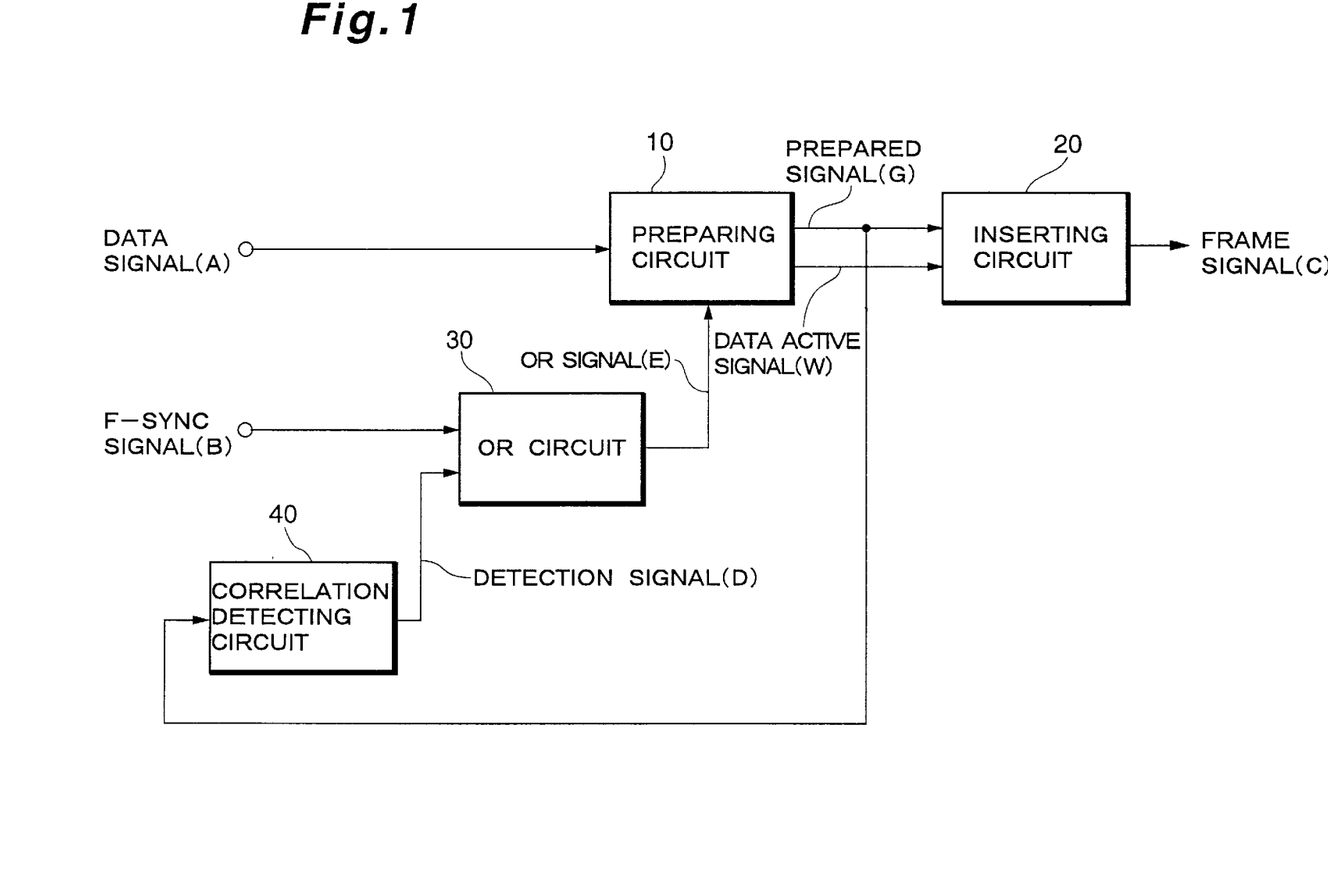
FIG. 1 is a diagram showing the configuration of the data transmission apparatus according to the first embodiment.

The first preferred embodiment of the data transmission apparatus will be described. First, the configuration of the data transmission apparatus will be explained. In FIG. 1, the data transmission apparatus is fed a data signal (A) and a frame synchronization signal (B) (hereinafter, abbreviated as "f-sync signal (B)"), and provides a frame signal (C). The data signal (A) includes a plurality of data, each data including a plurality of bits. The f-sync signal (B) includes a plurality of pulses, each pulses denoting the boundary between a data and an adjacent data. The frame signal (C) includes a plurality of frames and a plurality of flags. At the front end of each frame, there is a leading flag which shows the beginning of the frame and at the rear end of the frame, there is another flag which shows the ending of the frame. So, a frame is surrounded by at least one flag at each end.

Figure 2:
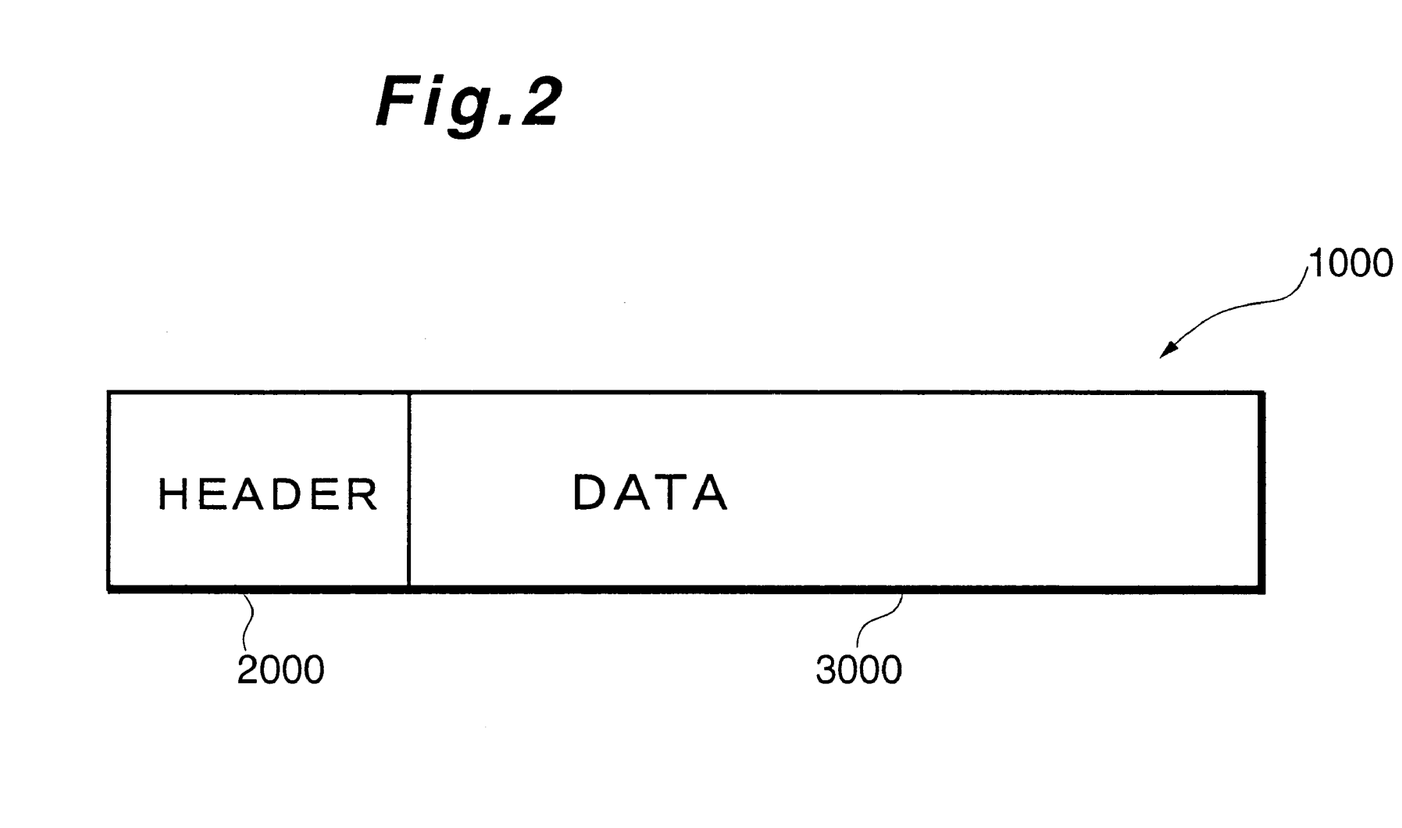
FIG. 2 is a diagram showing the configuration of the frame.

As shown in FIG. 2, each frame 1000 in the frame signal (C) is constructed of a header 2000 and a data 3000. The header 2000 indicates, for example, the serial number of the data 3000, the destination address thereof and others. To prepare such a frame, as illustrated in FIG. 1, the data transmission apparatus incorporates a preparing circuit 10, an inserting circuit 20, an OR circuit 30, and a correlation detecting circuit 40.

Figure 3:
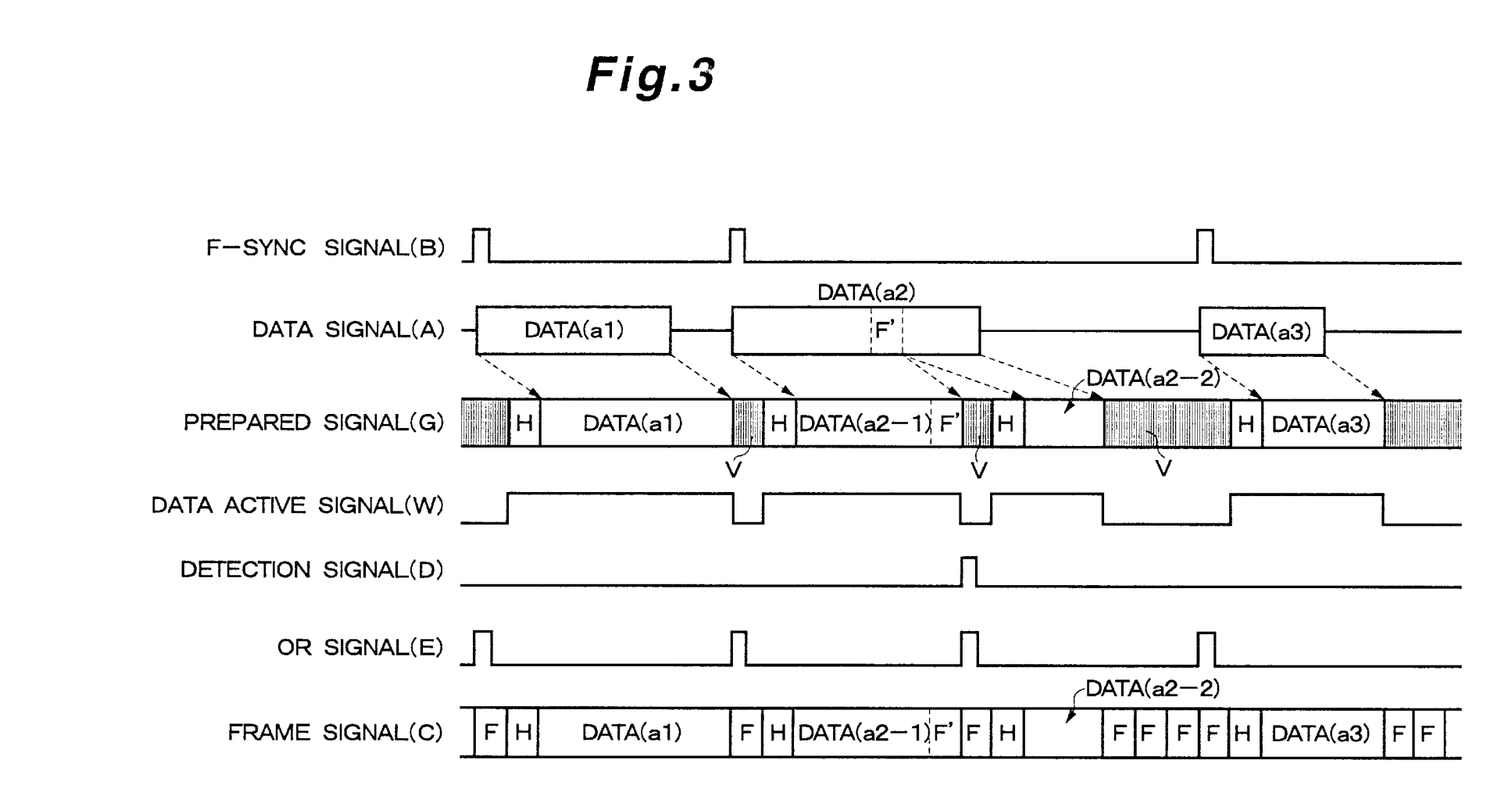
FIG. 3 is a diagram showing the operation of the data transmission apparatus according to the first embodiment.

The preparing circuit 10 processes the data signal (A) based on the OR signal (E), and outputs the prepared signal (G) to the inserting circuit 20. At the first stage of the operation, the preparing circuit 10 prepares the signal (A) based on the f-sync signal (B) as described afterwards. Namely, the preparing circuit adds the header (H) indicating the serial number, the destination address, and the data type(video, audio, etc.) of the frame to the head of the frame data, as shown in FIG. 3. And as described afterwards, to insert flag (F) at both ends of the frame at the inserting circuit 20, non-effective data which is longer than the flag length is inserted at the preparing circuit as shown in FIG. 3. The non-effective data is also for the correlation detecting circuit 40 to prevent wrong operation and has no correlation with the flag.

Besides, the preparing circuit 10 outputs data active signal (W) to the inserting circuit 20, indicating the effective position and the period of the frame.

The correlation detecting circuit 40 stores therein a reference flag pattern used for acquiring a correlation between the prepared signal (G) and the reference flag pattern. The correlation detecting circuit 40 detects in the prepared signal (G) a false flag, namely, a bit stream similar to the pattern of flags(F) based upon the correlation, thereby outputting the detection signal (D) to the OR circuit 30.

The OR circuit 30 executes a logical OR on the f-sync signal (B) and the detection signal (D), thus outputting the OR signal (E) (pulses), denotes the presence of both the boundaries of frames and the false flag, to the preparing circuit 10. The OR signal (E) is the base signal of the preparing circuit 10 for its operation. So, the preparing circuit 10 processes the above mentioned preparation in case of the false flag detection as well as in the case of the f-sync signal(B) arrival. In other words, if there is a false flag in the prepared signal(G), the frame comprising the false flag is ended immediately after the false flag and for the remaining data another frame is prepared and the same header with the former half is added before the remaining data stream.

The inserting circuit 20 inserts flag pattern (F) to the prepared signal(G) based on the data active signal(W). According to the present embodiment, the inserting circuit 20 changes the non-effective data period (the period when data correlation-less with the flag(F) are inserted) with the flag patterns based on the data active signal (W). For this reason, there are cases when a plurality of flags are inserted between two frames adjacent to each other.

Concerning non-effective signal, the time length of non-effective signal must be a multiple of the flag(F) pattern period, and there are cases when other patterns than the flag(F) pattern may be inserted.

Hereinafter, the operation of the data transmission apparatus will be explained with FIG. 3. When f-sync signal (B) is inputted, OR circuit 30 outputs a pulse shown as OR signal (E), and the preparing circuit 10 catches the data signal (A). Namely, the preparing circuit 10 catches data (a1). And adding a header (H) at the front of the data (a1), the preparing circuit 10 sets non-effective time period and adds non-effective data (V) to the non-effective time period, outputting it as the prepared signal (G). The prepared signal (G) is fed to the inserting circuit 20 and the correlation detecting circuit 40. Besides data active signal(W) indicating the position and the effective period of data (a1) is also outputted to the inserting circuit 20.

The inserting circuit 20 checks the incoming prepared signal (G), judges it non-effective data (V) based on the data active signal (W), changes it with flag (F) and outputs it as frame signal (C).

Next, the preparing circuit 10 catches the data (a2), adds header (H) and outputs it in the same way as before. However, in this case the data (a2) has a false flag (data having the similar pattern with the flag (F') in its data. The correlation detecting circuit 40 detects the false flag (F'), outputting the detection signal (D) to the OR circuit 30. Getting the OR signal (E) from the OR circuit, the preparing circuit 10 judges the data ends at the position when the preparing circuit catches the false flag (F') and outputs the prepared signal (G) including non-effective data (V), header (H), the data (a2-1) included the false flag (F').

On the other hands, on receiving the OR signal (E) which is outputted from the OR circuit 30 fed with the detection signal (D), the preparing circuit adds again the non-effective data (V) and the same header (H) before data (a2-2), and sends it to the inserting circuit 20 as the prepared signal (G) with the data active signal (W). The inserting circuit 20 changes the non-effective data (V) to the flag (F) based on the data active signal (W), and outputs it as the frame signal (C).

Namely, the remaining data (a2-2) is outputted as a normal and independent frame data stream. Consequently, even if the data receipt apparatus receiving the frame signal (C) misunderstands the false flag (F') as true flag (F), the data (a2-2) except the false flag (F') can be regenerated. To describe more definitely, the influence is only the loss of the false flag data included in the transmitted data.

<Second Embodiment>

The second embodiment of the data receipt apparatus will be now described in detail below. The combination of the data transmission apparatus according to the first embodiment and the conventional receipt apparatus, for example, the combination that the above-mentioned U.S. Pat. No. 6,266,349 has demonstrated as a prior art, is capable of avoiding a flag emulation. However, as shown in the frame signal (C) of FIG. 3, a bit stream similar to the flag pattern (F) cannot be regenerated and transmitted to the succeeding higher layer apparatus. Therefore, the purpose of the second embodiment is to save such bit streams.

Figure 4:
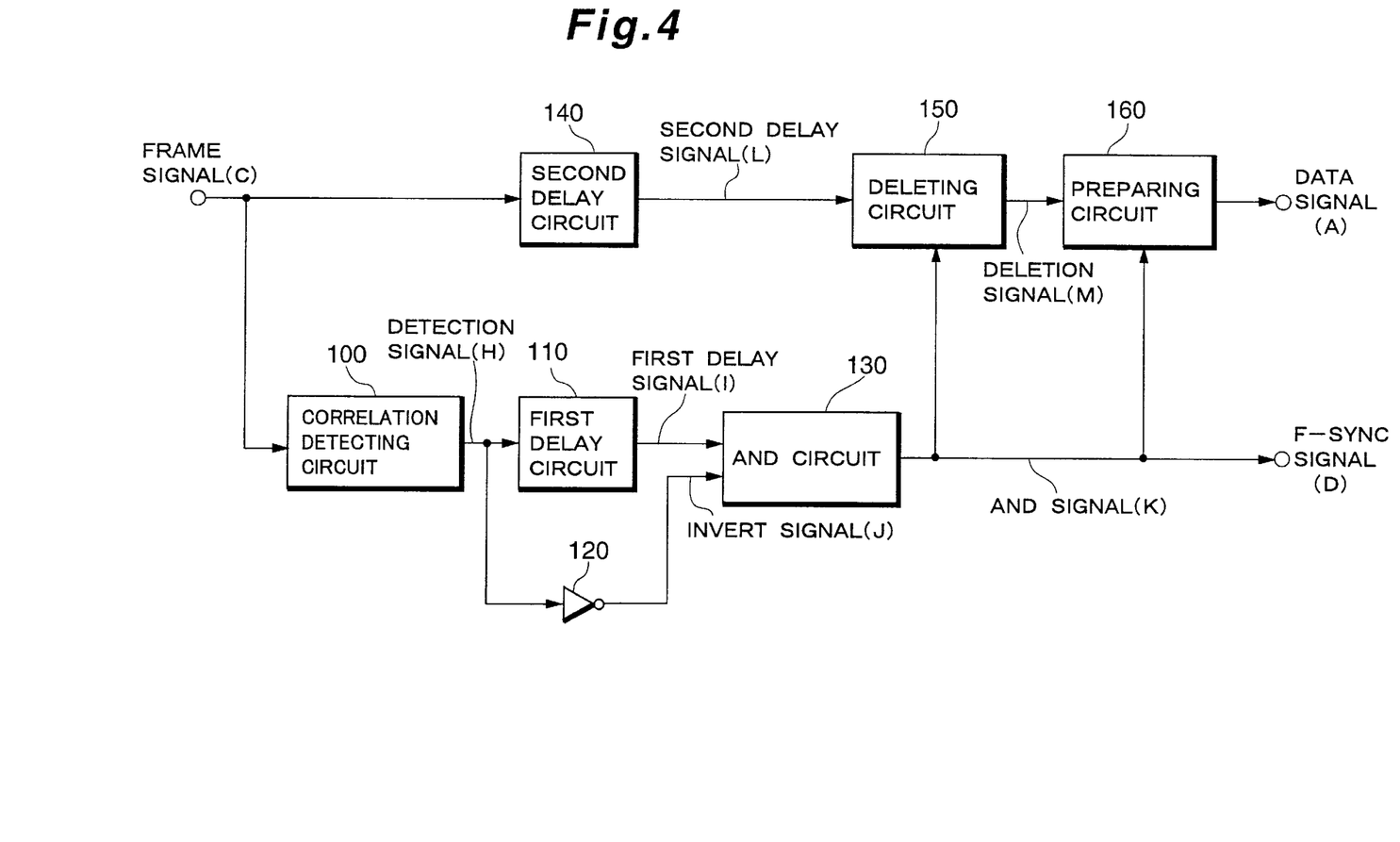
FIG. 4 is a diagram showing the configuration of the data receipt apparatus according to the second embodiment.

As shown in FIG. 4, the data receipt apparatus according to the second embodiment receives a frame signal (C) from a data transmission apparatus of the first embodiment and outputs a data signal (A) and a frame synchronization signal (D). The frame signal (C) is identical with that of the first embodiment while the data signal (A) is also identical with that of the first embodiment, but the frame synchronization (f-sync) signal (D) is a little different with the one of the first embodiment.

To produce the data signal (A) and the f-sync signal (D) from the frame signal (C), the data receipt apparatus incorporates a correlation detecting circuit 100, a first delay circuit 110, an inverter circuit 120, an AND circuit 130, a second delay circuit 140, a deleting circuit 150, and a preparing circuit 160.

The correlation detecting circuit 100 detects flags (F) and bit streams similar to the flag (F) (hereinafter referred to as "false flag (F')") based upon the correlation between the incoming frame signal (C) and the reference flag stored in the correlation detecting circuit 100, and outputs detection signal(H). Herein, the reference flag is same with that of the first embodiment. The first is delay circuit 110 delays the detection signal (H) produced by the correlation detecting circuit 100, while the second delay circuit 140 delays the incoming frame signal(C). The amount delayed by the first delay circuit 110 and the amount delayed by the second delay circuit 140 are identical with each other.

The inverter circuit 120 logically inverts the detection signal (H). The AND circuit 130 implements a logical AND on both the first delay signal (I) yielded by the first delay circuit 110 and the invert signal (J) yielded by the inverter circuit 120. So, when a plurality of flags(F) come successively, no pulse is outputted at the first flag position, but at the last true flag position, AND signal is outputted. The deleting circuit 150 deletes true flags from the second delay signal (L) referring to the AND signal (K). The preparing circuit 160 extracts the data signal(A) from the deletion signal (M).

Figure 5:
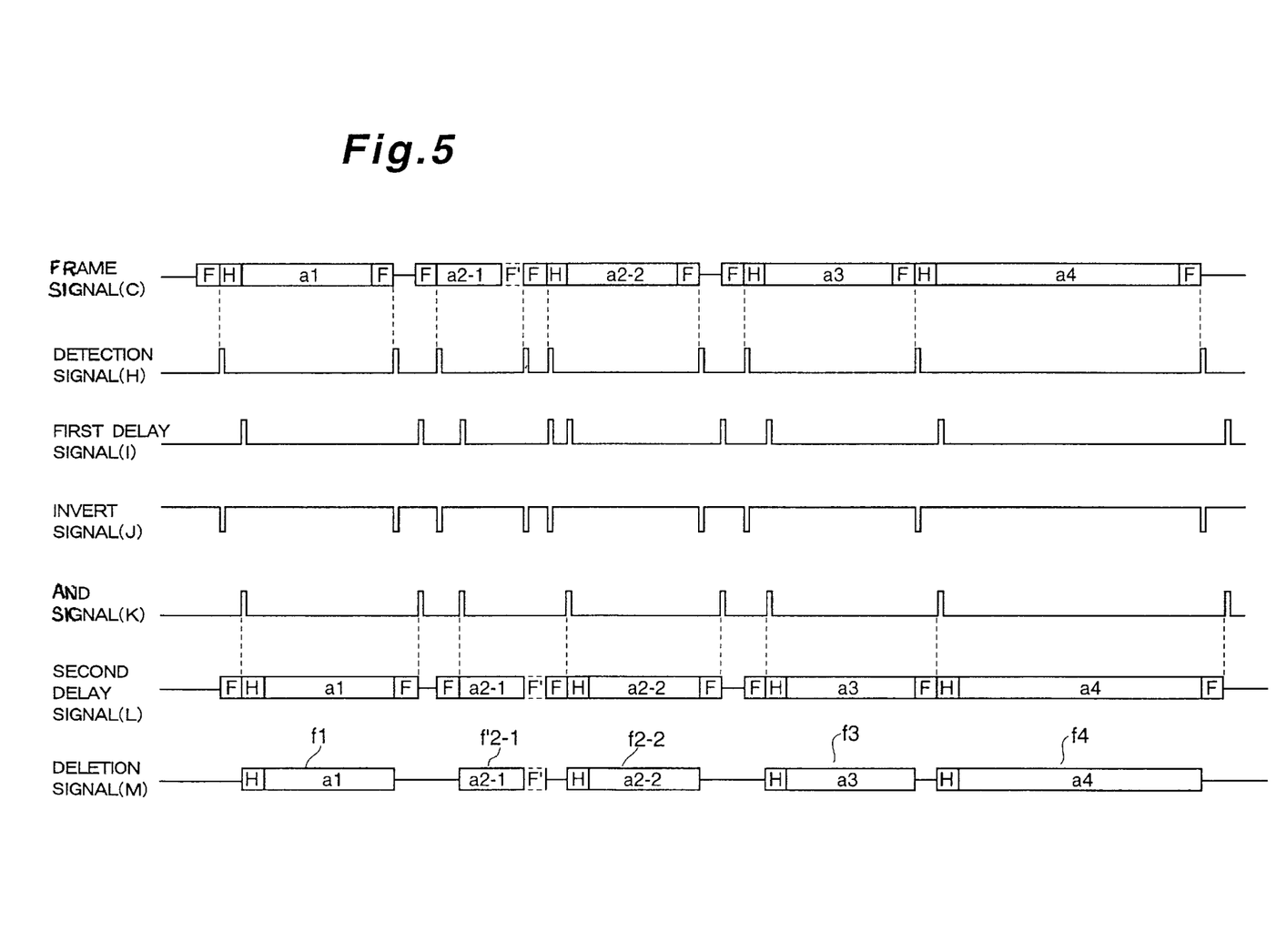
FIG. 5 is a diagram showing the operation of the data receipt apparatus according to the second embodiment.

The operation of the data receipt apparatus according to the second embodiment will be now explained hereinafter with the reference to FIG. 4 and FIG. 5. The explanation proceeds on assumption that a false flag (F') is laid in the frame signal (C). Once the frame signal (C) is fed into the data receipt apparatus, the correlation detecting circuit 100 detects the flags (F) and the false flag (F') in the frame signal (C), thus outputting to the first delay circuit 110 and the inverter circuit 120, the detection signal (H) denoting the positions thereof. Receiving the detection signal (H), the first delay circuit 110 delays the detection signal (H) by the length of one flag to provide the first delay signal (I) while the inverter circuit 120 inverts the detection signal (H) to yield the invert signal (J). Fed with both the first delay signal (I) and the invert signal (J), the AND circuit 130 executes a logical AND thereon, thereby giving the AND signal (K) to the deleting circuit 150 and the preparing circuit 160. The AND signal (K) is outputted as f-sync signal(D). As described above, in case of the succession of flag signals (F), the AND circuit outputs pulses at the last flag position only, at the execution of a logical AND on the first delay signal (I) and the invert signal (J).

On the other hand, the second delay circuit 140 delays the frame signal (C) by the length of one flag, which is equal to that of the first delay circuit 110. Thereby, the second delay circuit 140 outputs to the deleting circuit 150 the second delay signal (L). Since the AND signal (K) synchronizes with the second delay signal (L) wherein the pulses in the AND signal (K) indicate the ending positions of the flags (F), the deleting circuit 150 deletes the flags (F) from the second delay signal (L) with reference to the AND signal (K).

The deleting circuit 150 then outputs to the preparing circuit 160, the deletion signal (M) that has no flag (F) but has the false flag (F'). Using the deletion signal (M), the preparing circuit 160 prepares the data signal (A). In case that a plurality of flag are included between the two frames adjacent to each other, the flags except the last flag of them are transmitted to the higher layer apparatus (not described in FIG. 6), but there will be no trouble as it is possible for the higher layer apparatus to judge the flag as non-effective data. In conclusion, the preparing circuit 160 outputs the data signal (A) including the data (a1), (a2-1, F'), (a2-2), (a3), and (a4).

The combination with the conventional receipt apparatus and the transmission apparatus according to the first embodiment, deletes the false flags(F') in the inputted data signal(A). On the other hands, the combination with the receipt apparatus according to the second embodiment and the transmission apparatus according to the first embodiment can output the false flag(F') as a part of the data signal to the higher layer apparatus (not shown in FIG. 6) which will be connected to the output of the receipt apparatus.

<Third Embodiment>

The data transmission apparatus of the third embodiment will be now described hereinafter. Since the transmitting signal from the transmission apparatus according to the first embodiment has the form of the frame signal (C) shown in FIG. 3, the transmission apparatus cannot transmit the false flag data (F'), except with the combination of the receipt apparatus according to the second embodiment. The purpose of the transmission apparatus according to the third embodiment is to make it possible for the false flag data to be able to be transmitted by the combination with conventional receipt apparatus.

Figure 6:
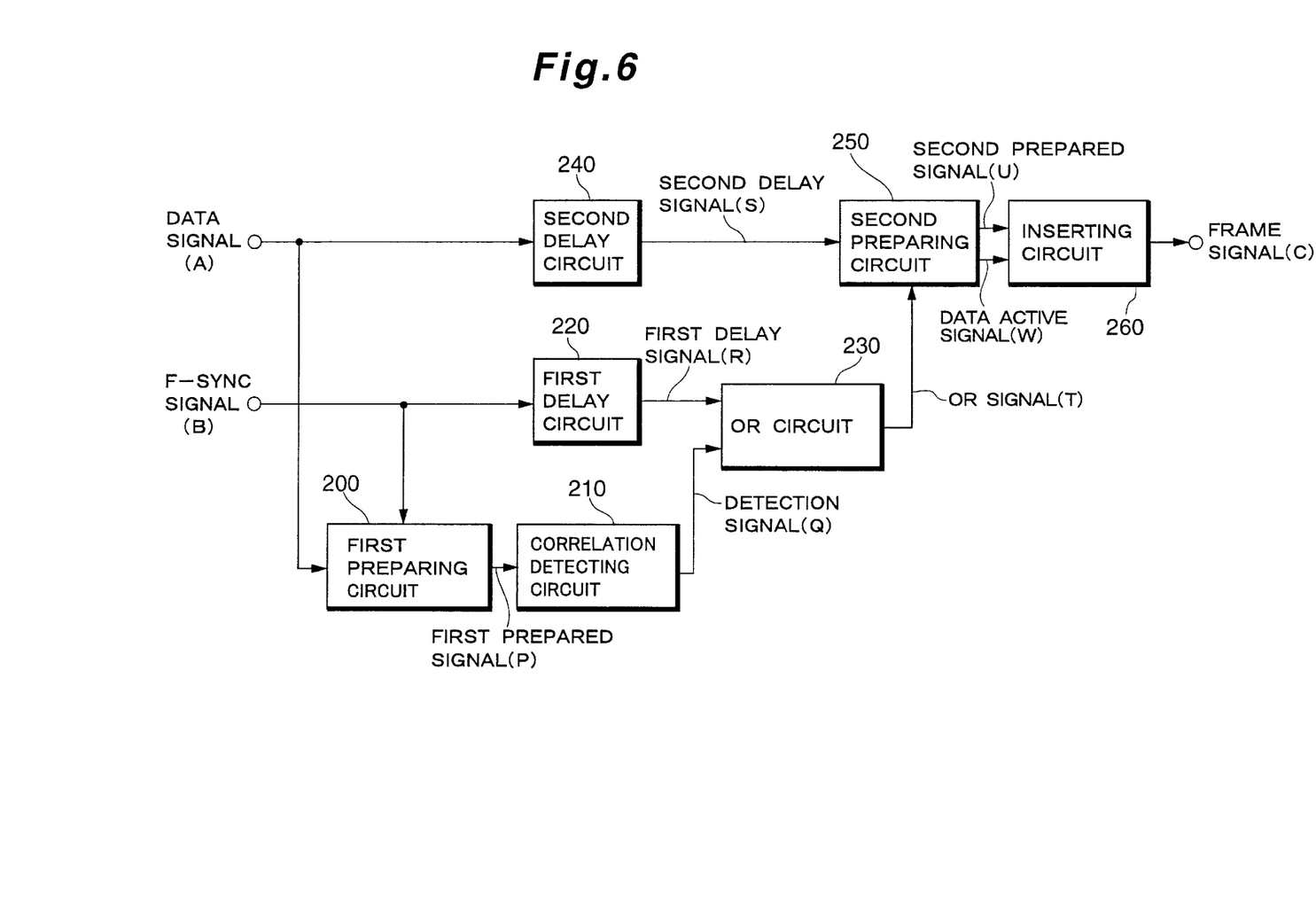
FIG. 6 is a diagram showing the configuration of the data transmission apparatus according to the third embodiment.

To perform such a transmission, the data transmission apparatus incorporates a first preparing circuit 200, a correlation detecting circuit 210, a first delay circuit 220, a OR circuit 230, a second delay circuit 240, a second preparing circuit 250, and an inserting circuit 260.

The first preparing circuit 200 adds a header (H) and others for each data in the incoming data signal (A). The correlation detecting circuit 210 detects a false flag based upon the correlation between the first prepared signal (P) and the reference flag, thus yielding the detection signal (Q). The first delay circuit 220 delays the f-sync signal (B) by half the length of one flag, thereby providing the first delay signal (R). The OR circuit 230 performs a logical OR on the first delay signal (R) and the detection signal (Q), to output the OR signal (T). The second delay circuit 240 delays the data signal (A) by half the length of one flag which is equal to the delay time of the first delay circuit 220, outputting the second delay signal (S). The second preparing circuit 250 adds a header to each data stream to prepare a frame therefor. The inserting circuit 260 inserts flags for the frames. The amount of the delay produced in the first delay circuit 220 and the second delay circuit 240 need not be exactly half the length of one flag (H), but must be long enough to divide the false flag (F').

Figure 7:
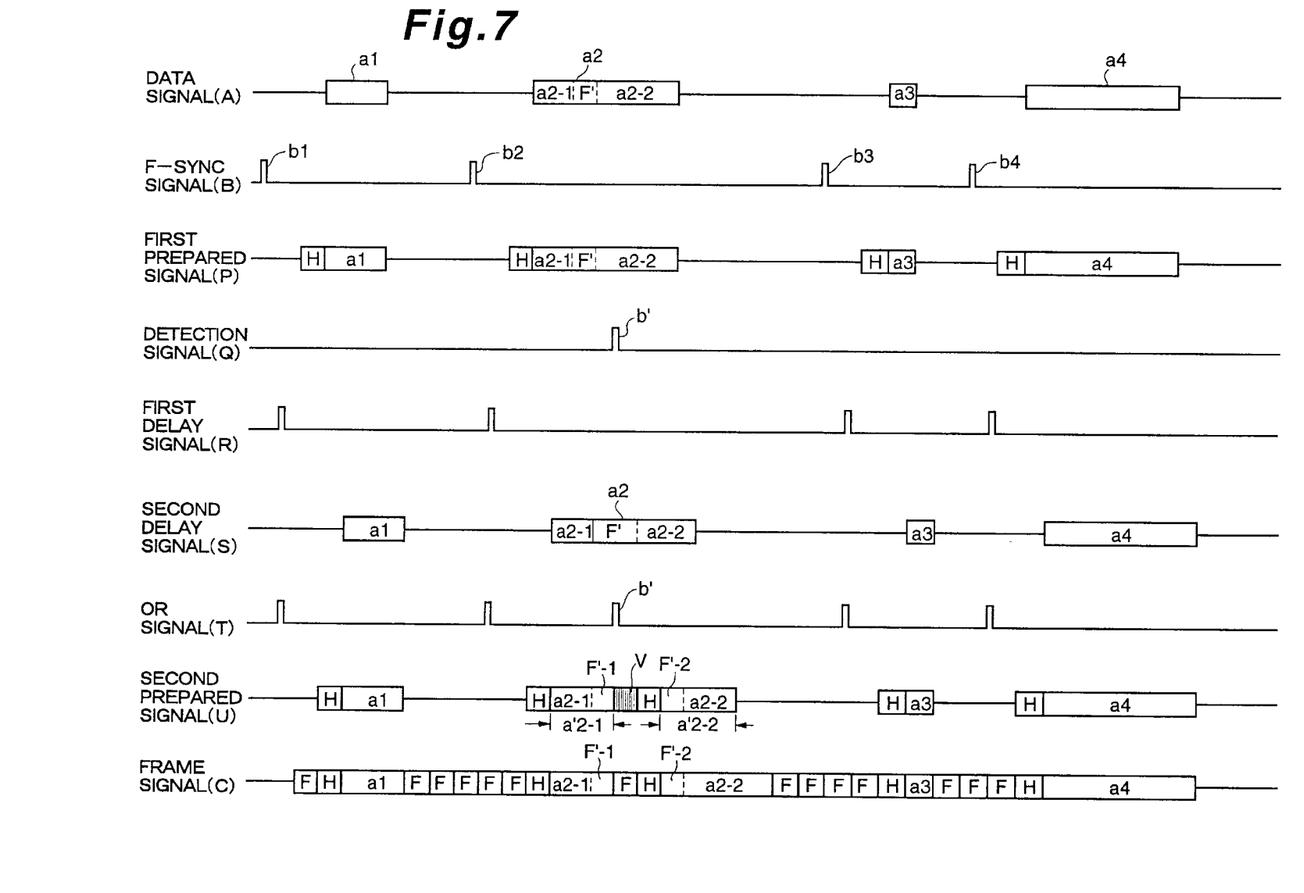
FIG. 7 is a diagram showing the operation of the data transmission apparatus according to the third embodiment.

The operation of the data transmission apparatus will be now described referring to FIG. 7 below. The data transmission apparatus of the third embodiment is fed with the data signal (A) and the f-sync signal (B), which are same to those of the first embodiment. First, upon receipt of the data signal (A) and the f-sync signal (B), the first preparing circuit 200 adds a header (H) and others for each of the data (a1), (a2), (a3), and (a4) in the data signal (A) in reference to the f-sync signal (B), thus outputting to the correlation detecting circuit 210 the first prepared signal (P) including a plurality of frames. Receiving the first prepared signal (P), the correlation detecting circuit 210 detects a false flag (F')

based upon the correlation between the first prepared signal (P) and the reference flag stored in the correlation detecting circuit 210 to produce the detection signal (Q).

On the other hand, the first delay circuit 220 delays the f-sync signal (B) by half the length of one flag while the second delay circuit 240 similarly delays the data signal (A) by half the length of one flag. Consequently, the first delay circuit 220 provides the first delay signal (R) and the second delay circuit 240 provides the second delay signal (S). Fed with the detection signal (Q) and the first delay signal (R), the OR circuit 230 executes a logical OR thereon, thus providing the second preparing circuit 250 with the OR signal (T) denoting the positions where flags should be inserted. Upon receipt of the OR signal (T) and the second delay signal (S), the second preparing circuit 250 adds a header (H) for each data (a1), (a3), (a2), and (a4). Besides, the second preparing circuit 250 divides the data (a2) into two parts at the middle position of the false flag(F') based upon the pulse (b') laid in the detection signal (Q) which is a half of one flag earlier than other signal. The two parts includes the first half (a'2-1) and the latter half (a'2-2). The first half (a'2-1) has the first half (a2-1) and the first half (F'-1) of the false flag (F') while the latter half (a'2-2) has the latter half (F'-2) of the false flag (F') and the latter half (a2-2). The second preparing circuit 250 prepares a header (H) for each of the first and latter halves (a' 2-1) and (a' 2-2), thus providing the inserting circuit 260 with the second prepared signal (U).

To indicate the position of the flag to be inserted in the second prepared signal(U), the second preparing circuit 250 outputs also the data active signal (W) which indicate both the position of the insertion and effective period of the data signal. Fed with the second prepared signal (U), the inserting circuit 260 inserts flags thereinto with reference to the OR signal (T) and the data active signal (W), thereby to produce the frame signal (C).

As described above, the data transmission apparatus of the third embodiment detects the false flag (F') in the first prepared signal (P) to divide the data (a2) into two halves (a2-1) and (a2-2) at the middle position of the false flag (F'), thus preparing a frame for each half. Therefore, differing from the data transmission apparatus of the first embodiment, the data transmission apparatus of the third embodiment can securely transmit a bit stream including false flags which can be regenerated even with conventional receipt apparatus.

Similar to the data transmission apparatus of the first embodiment, the data transmission apparatus of the third embodiment preferably detects a false flag in the signal including headers as well as data. This allows the receipt apparatus to completely avoid a flag emulation. The transmission apparatus according to the third embodiment transmits the false flag with two frames diving it into two parts. For this reason, it can be prevented for the false flag to be misunderstood as a flag concerning the frame signal (C) outputted from the transmission apparatus according to the third embodiment.

While the present invention has been described in terms of the preferred embodiment, the invention is not to be limited thereto, but can be embodied in various ways without departing from the principle of the invention as defined in the appended claims.

What is claimed is:

1. A data transmission apparatus which prepares a frame signal including a plurality of frames and a plurality of flags enabling recognition of the plurality of frames, wherein each frame includes a bit stream and an additional data and each flag is laid between two frames adjacent to each other, the data transmission apparatus comprising:
   a detecting circuit which detects a false pattern similar to the pattern of the flags in each bit stream; and
   a preparing circuit which prepares at least one frame using a portion of the bit stream other than the detected false pattern;
   wherein the preparing circuit includes an additional data preparing means for preparing the additional data for the portion, and a frame preparing means for preparing a frame using the additional data and the portion.

2. A data transmission apparatus which prepares a frame signal including a plurality of frames and a plurality of flags enabling recognition of the plurality of frames, wherein each frame includes a bit stream and an additional data and each flag is laid between two frames adjacent to each other, the data transmission apparatus comprising:
   a detecting circuit which detects a false pattern similar to the pattern of the flags in each bit stream; and
   a preparing circuit which prepares at least one frame using a portion of the bit stream other than the detected false pattern;
   wherein the detecting circuit detects the false pattern in the prepared frame, and the preparing circuit prepares another frame using the portion of the prepared frame other than the detected false pattern therein.

3. A data transmission apparatus which prepares a frame signal including a plurality of frames comprising an input data signal and a plurality of flags enabling recognition of the plurality of frames, wherein each frame includes a bit stream and an additional data and each flag is laid between two frames adjacent to each other, the data transmission apparatus comprising:
   a detecting circuit which detects a false pattern similar to the pattern of the flags in each bit stream;
   a dividing means for dividing the bit stream into a first and a second portions so that the first portion includes a part of the detected false pattern and the second portion includes the other part thereof; and
   a preparing circuit which prepares a first frame using the first portion and prepares a second frame using the second portion.

4. A data transmission apparatus as set forth in claim 3, wherein the preparing circuit includes an additional data preparing means for preparing first additional data for the first portion and second additional data for the second portion, and a frame preparing means for preparing the first frame using the first additional data and the first portion and the second frame using the second additional data and the second portion.

5. A data transmission apparatus as set forth in claim 3, wherein the detecting circuit detects the false pattern in the prepared frame, and the preparing circuit prepares another frame using a portion of the prepared frame containing one part of the detected false pattern therein.

6. A data transmission apparatus as set forth in claim 3, wherein the detecting circuit produces a detection signal, the preparing circuit inserts the second flag into the bit stream in response to the detection signal, and the dividing means includes a delay circuit which delays the input data signal by a predetermined amount approximately equal to half the duration of the false pattern, so that the second flag divides the detected false pattern approximately in half.

7. A data reception apparatus which receives a frame signal including a plurality of frames, a plurality of first flags, and a second flag, wherein each frame includes a bit stream and an additional data, each first flag is laid between two frames adjacent to each other, and the second flag is laid at a predetermined time following a false pattern similar to the pattern of the flags in the frame signal, the pattern of the firsts flags and the pattern of the second flag being identical with each other, the data reception apparatus comprising:

- a detecting circuit which detects a plurality of patterns similar to the pattern of the flags in the frame signal;
- a recognizing means for recognizing a first pattern and a second pattern at the predetermined time following the first pattern among the plurality of detected patterns, as the false pattern and the second flag; and
- a deleting circuit which deletes the recognized plurality of first flags and the recognized second flag from the frame signal to prepare a data signal including the plurality of frames.

8. A data reception apparatus as set forth in claim 7, wherein the detecting circuit produces a detection signal and the recognizing means includes: a delay circuit which delays the detection signal by the predetermined time; an inverter circuit which inverts the detection signal; and an AND circuit which ands the delayed detection signal and the inverted detection signal.

9. A data reception apparatus as set forth in claim 7, wherein the plurality of first flags and a second flag each have a same duration and the duration is the same as the predetermined time.

* * * * *